United States Patent
Aselage et al.

(10) Patent No.: US 9,254,807 B1
(45) Date of Patent: Feb. 9, 2016

(54) ACTIVE BOLSTER WITH PITTED WELD TRACK

(71) Applicant: FORD GLOBAL TECHNOLOGIES, LLC, Dearborn, MI (US)

(72) Inventors: Brandon M. Aselage, White Lake, MI (US); Sean B. West, Monroe, MI (US); Stacey H. Raines, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 22 days.

(21) Appl. No.: 14/492,142

(22) Filed: Sep. 22, 2014

(51) Int. Cl.

| | |
|---|---|
| *B60R 21/04* | (2006.01) |
| *B60R 13/02* | (2006.01) |
| *B62D 27/02* | (2006.01) |
| *B29C 65/00* | (2006.01) |
| *B60R 21/045* | (2006.01) |
| *B29C 65/02* | (2006.01) |
| *B29C 65/20* | (2006.01) |
| *B60R 21/205* | (2011.01) |
| *B29L 31/30* | (2006.01) |
| *B29K 705/00* | (2006.01) |
| *B29L 22/02* | (2006.01) |

(52) U.S. Cl.
CPC ............... *B60R 21/04* (2013.01); *B29C 65/02* (2013.01); *B29C 65/20* (2013.01); *B29C 66/1142* (2013.01); *B29C 66/242* (2013.01); *B29C 66/3034* (2013.01); *B29C 66/322* (2013.01); *B29C 66/341* (2013.01); *B29C 66/54* (2013.01); *B60R 13/02* (2013.01); *B60R 21/045* (2013.01); *B60R 21/205* (2013.01); *B62D 27/02* (2013.01); *B29C 66/8322* (2013.01); *B29K 2705/00* (2013.01); *B29L 2022/02* (2013.01); *B29L 2031/3005* (2013.01); *B60R 2013/0287* (2013.01); *B60R 2021/0407* (2013.01)

(58) Field of Classification Search
CPC .... B60R 21/04; B60R 21/205; B60R 21/045; B60R 13/02; B60R 2021/0407; B60R 2013/0287; B29C 66/3034; B29C 66/341; B29C 65/20; B29C 66/242; B29C 66/54; B29C 65/02; B29C 66/322; B29C 66/1142; B29C 66/8322; B62D 27/02; B29K 2705/00; B29L 2031/3005; B29L 2022/02
See application file for complete search history.

(56) References Cited

U.S. PATENT DOCUMENTS

| | | | |
|---|---|---|---|
| 6,213,497 B1 * | 4/2001 | Spencer | B60R 21/045 280/730.1 |
| 6,976,706 B2 | 12/2005 | Smith et al. | |
| 7,654,557 B2 * | 2/2010 | Enders | B60R 21/206 280/728.2 |
| 7,845,366 B2 | 12/2010 | Brock et al. | |
| 8,454,054 B1 | 6/2013 | Raines | |

(Continued)

*Primary Examiner* — Drew Brown
(74) *Attorney, Agent, or Firm* — Vichit Chea; MacMillan, Sobanski & Todd, LLC

(57) ABSTRACT

An active bolster for an automotive vehicle has a outer trim panel with a welding track. An expandable bladder member has a central section configured to attach to a support structure of a vehicle, a welding flange along a peripheral edge, and a pleated region between the central section and the welding flange. The welding track and the welding flange are joined by a hot weld to form a sealed chamber. The welding track includes a plurality of radially-spaced stepped pits. Each pit has an upper section defining a first opening with a respective first cross-sectional area and a lower section defining a second opening with a respective second cross-sectional area smaller than the respective first area. A perimeter of each upper section is melted by the hot weld and a perimeter of each lower section is not melted by the hot weld.

7 Claims, 4 Drawing Sheets

(56) References Cited

U.S. PATENT DOCUMENTS

| | | |
|---|---|---|
| 8,474,868 B2 | 7/2013 | Kalisz et al. |
| 8,491,008 B2 | 7/2013 | Roychoudhury et al. |
| 8,579,325 B2 | 11/2013 | Roychoudhury |
| 9,061,643 B1 * | 6/2015 | Raines .................. B60R 21/04 |
| 9,067,557 B1 * | 6/2015 | Aselage ................ B60R 21/206 |
| 9,120,450 B1 * | 9/2015 | Aselage ................ B60R 21/205 |
| 9,156,422 B1 * | 10/2015 | Raines .................. B60R 21/04 |
| 2008/0061537 A1 * | 3/2008 | Enders .................. B60R 21/206 280/730.1 |

* cited by examiner

US 9,254,807 B1

ACTIVE BOLSTER WITH PITTED WELD TRACK

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to increasing robustness of the bonding between an expandable bladder member and a trim wall which are separately molded.

An active bolster is a vehicle occupant protection device with a gas-inflatable bladder to absorb impacts and reduce trauma to occupants during a crash. As opposed to deployable air bag cushions that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes an outer wall or trim panel that faces a vehicle occupant attached to an inner wall or panel along a sealed periphery. One or both of the walls is deformable in order to provide an inflatable bladder. For example, the inner wall (i.e., bladder wall) may have a pleated (i.e., accordion-like) region that straightens out during inflation. The walls are initially spaced apart by a small amount when in their pre-deployment, non-inflated condition. This allows ingress of the inflation gas in a manner that can achieve an even inflation across the panel.

The inner and outer walls of a typical active bolster are comprised of molded thermoplastics such as polyethylene, polyolefin, or PVC. They are typically injection molded but could also be blow molded. When formed separately, the walls must be hermetically joined around their periphery in order to form the inflatable bladder. The joint must be strong to resist separation as a result of the high pressures during inflation.

A known method of sealing the bladder walls is by hot welding, which involves heating of the matching surfaces and then compressing them together. Examples include hot plate welding, IR welding, and laser welding. A generally planar welding flange has been provided around the outer perimeter of an inner (bladder) wall which is received by a generally planar surface of an outer (trim) wall. The outer wall and/or inner surfaces may also include upstanding welding ribs that increase the weld strength by penetrating and fusing with the welding flange or other opposing surface during the hot welding process in which the areas to be welded are heated and then compressed. Despite the penetration of these ribs, weld separation has continued to be a potential failure mode for active bolsters for various reasons including warping of the parts to be welded, temperature variations of the hot plates during welding, uncorrected variances in the pressure applied during welding, and characteristic differences between the trim wall and bladder wall which may be molded from different plastic formulations.

Various stresses during inflation also contribute to the possibility of weld failure. Due to the elasticity required for making the pleated bladder wall inflatable, a significant peel stress may be applied to the weld seam during expansion. Another source of stress is the shock wave caused by the explosive initiation of gas flow from the inflator. Twisting and uneven bulging of the overall bladder structure during inflation can create stress or concentrate existing stresses at certain weld locations (e.g. along long straight edges of the weld).

SUMMARY OF THE INVENTION

In one aspect of the invention, an active bolster is provided for an interior trim surface of an automotive vehicle. A plastic-molded outer trim panel has a welding track on an inside surface. A plastic-molded expandable bladder member has a central attachment section configured to attach to a support structure of the vehicle, a welding flange along a peripheral edge, and a pleated region between the central attachment section and the welding flange. The welding track and the welding flange are joined by a hot weld to form a sealed chamber. The welding track includes a plurality of radially-spaced stepped pits. Each stepped pit has an upper section defining a first opening with a respective first cross-sectional area and a lower section projecting from a respective upper section and defining a second opening with a respective second cross-sectional area smaller than the respective first cross-sectional area. A perimeter of each upper section is melted by the hot weld and a perimeter of each lower section is not melted by the hot weld.

DETAILED DESCRIPTION OF PREFERRED EMBODIMENTS

Figure 1:
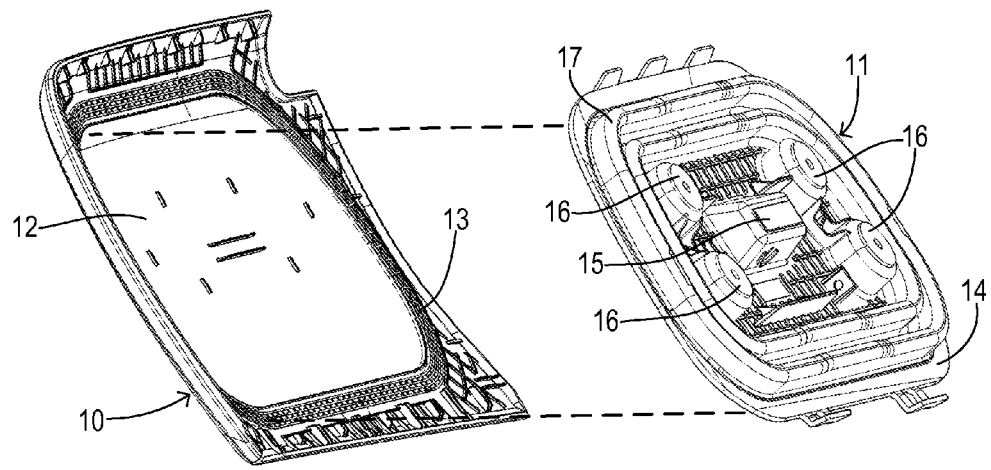
FIG. 1 is a perspective, exploded view of a prior art active bolster assembly including a trim panel front wall and back bladder wall.
Figure 2:
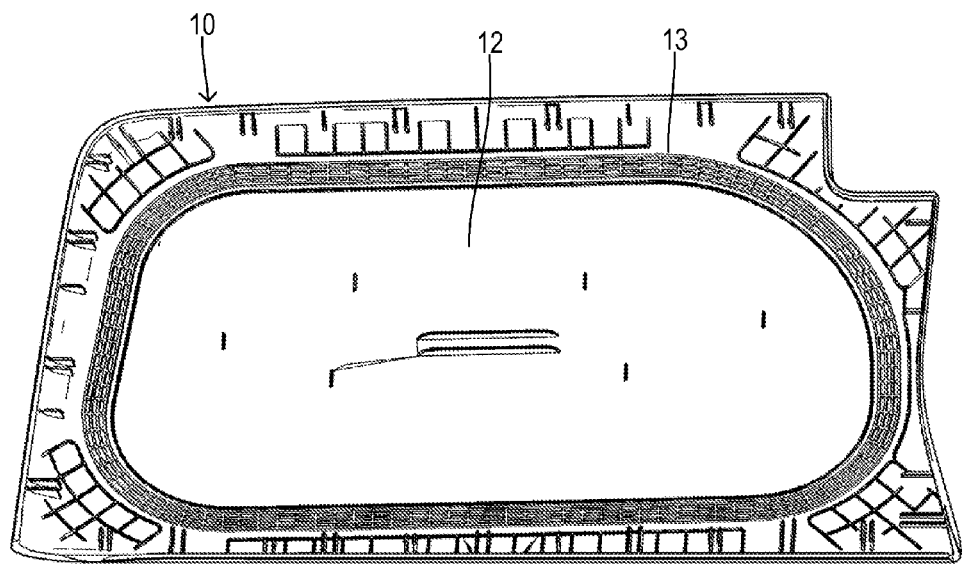
FIG. 2 is a rear plan view of an inside surface of the trim panel front wall.

FIGS. 1-4 show a prior art active bolster wherein an active bolster is formed using an interior trim panel which is part of a glove box door in an automotive vehicle. More specifically, a trim panel 10 functions as a front trim wall which receives an expandable bladder wall 11. Panel 10 has an inside surface 12 with a welding track or raceway 13 preferably formed as a rib that extends upward from the inside surface in order to bond with an outer flange 14 of bladder wall 11 (e.g., by plastic welding such as hot plate welding).

Bladder wall 11 has a recess 15 near the center for mounting an inflator (not shown) and a plurality of mounting towers 16 for attaching the assembly to a reaction surface, such as an inner panel of the glove box door (not shown). A pleated region 17 is formed between towers 16 and outer flange 14 so that a series of pleats can unfold during inflation in a manner that allows trim panel 10 to displace toward the passenger cabin to cushion an impacting passenger.

Hot welding of track 13 and flange 14 creates a bladder cavity for receiving inflation gas from the inflator. During the hot welding operation, a hot plate, laser, or other heat source are used to melt plastic material of track 13 and flange 14, and after the heat source is removed then track 13 and flange 14 are pressed together and cooled so that the melted materials intermix and become welded together.

Figure 3:
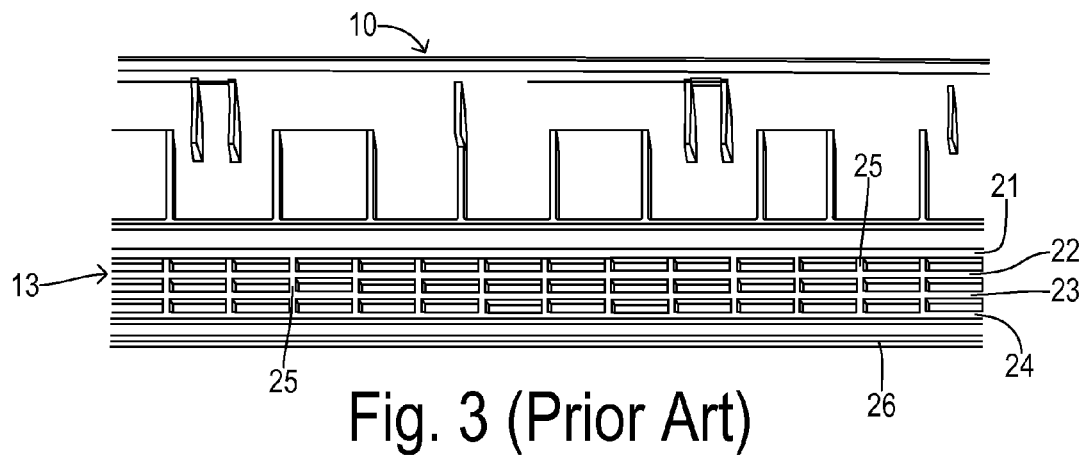
FIG. 3 is a plan view showing a portion of the prior art weld track of FIG. 2 in greater detail.
Figure 4:
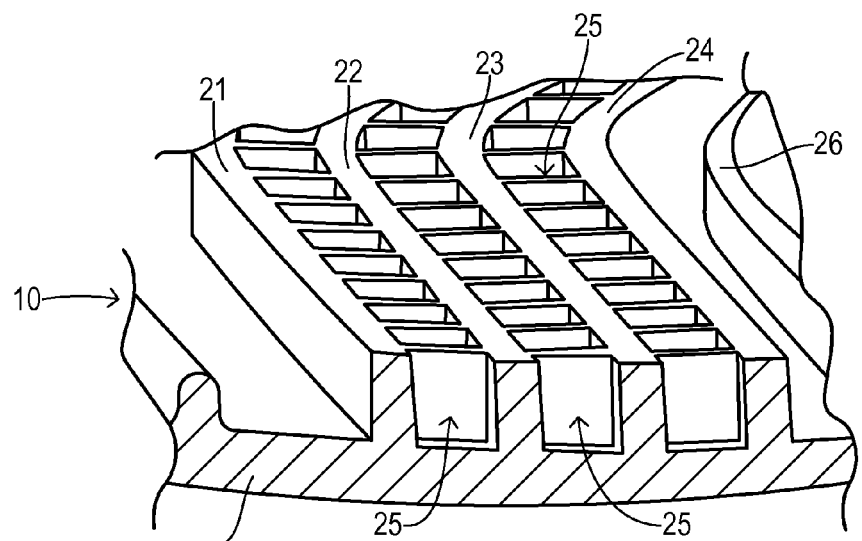
FIG. 4 is a perspective, cross-sectional view of the weld track of FIG. 2.

FIGS. 3 and 4 show one configuration of weld track 13 in greater detail. Trim panel 10 has a main body 20 which is substantially planar. Track 13 comprises a plurality of circumferential ribs 21-24 extending from the inside surface of main body 20. A plurality of cross members 25 extend in a grid fashion between adjacent ribs 21-24 in order to provide additional material and surface area to facilitate melting during the hot weld operation. During formation of the hot weld, ribs 21-24 and cross members 25 are each completely melted by the applied heat. An additional upstanding rib 26 (not part of the hot weld) may be pressed against or interlock with the bladder member to provide a barrier against the inflation gas to help reduce peel stress on the hot weld.

The invention uses a series of stepped pits in the hot weld surfaces in order to increase the intrinsic strength of the hot weld. As shown in a first embodiment in FIG. 5, a weld track 30 includes a plurality of radially-spaced stepped pits 31. As shown in FIG. 6, each stepped pit 31 formed in welding track 30 has an upper section 32 and a lower section 33. Upper sections 32 are characterized by an opening 34 with a size (e.g., width or diameter) that provides a first cross-sectional area bigger than a second cross-sectional area of lower section 33 resulting from its second opening 35 where lower section 33 projects downward from upper section 34. As described below, each pit 31 may be cylindrical, rectangular, or any other convenient shape providing a width or cross-sectional opening which is larger for upper sections 32 than for lower sections 33. Moreover, the respective depths of upper and lower sections 32 and 33 are preferably selected such that at least a portion of a perimeter 36 of each upper sections 32 is melted during the hot weld forming process, while at least a portion of a perimeter 37 of each lower section 33 is not melted by the hot weld.

Figure 5:
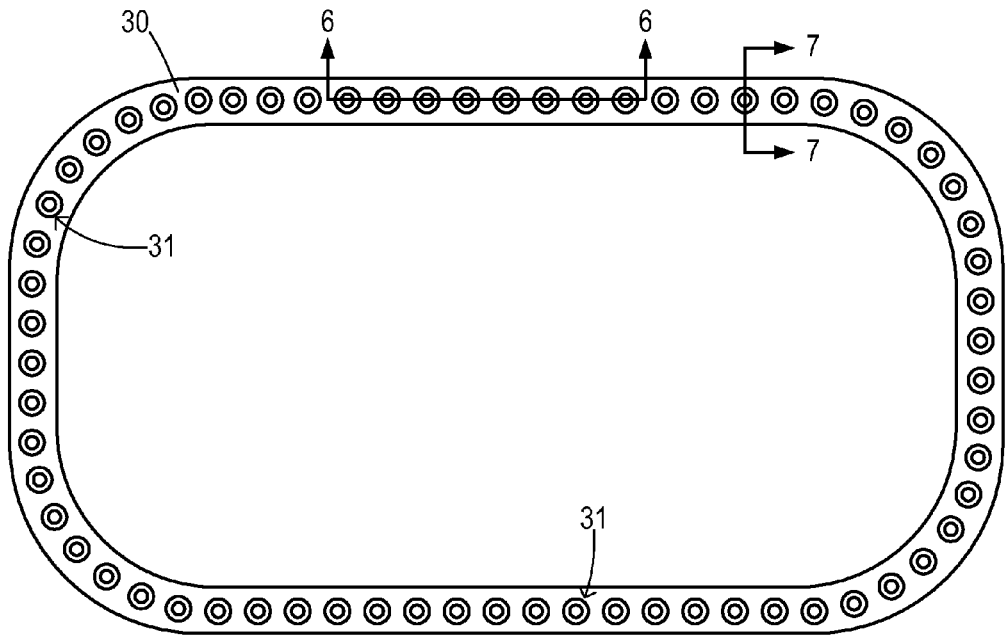
FIG. 5 is a plan view of one embodiment of a weld track of the present invention wherein a raised welding track is formed having stepped pits spaced radially along the track.
Figure 6:
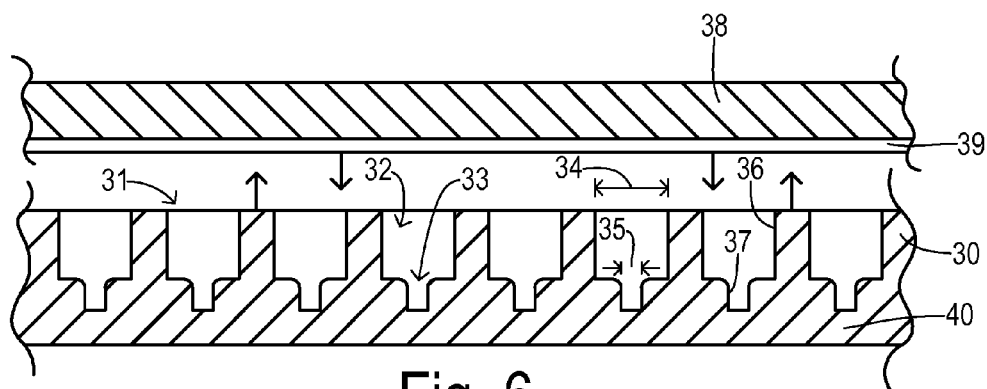
FIG. 6 is a cross-sectional view of the weld track along line 6-6 of FIG. 5.

FIG. 6 is a cross-section viewed along line 6-6 of FIG. 5 showing the components of a bolster assembly during a hot weld forming process. A flange 38 of a bladder member may carry a rib 39. A main body 40 of the trim panel supports welding track 30 which in this embodiment is formed as an upstanding rib. After at least partial melting of welding track 30 and welding flange 38, the components are pressed together in the directions shown using a fixture in order to form the hot weld.

Figure 7:
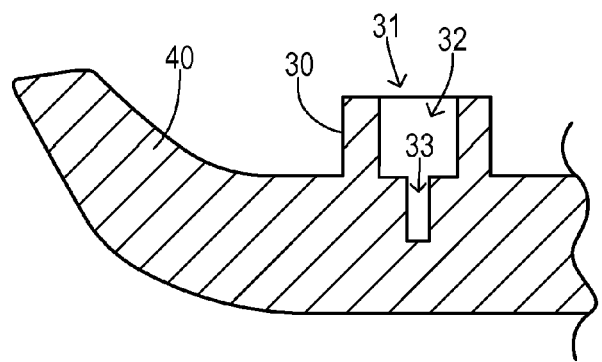
FIG. 7 is a cross-sectional view of the weld track along line 7-7 of FIG. 5.

FIG. 7 shows a cross-section viewed along line 7-7 of FIG. 5 wherein welding track 30 is seen as a raised rib. Pit 31 illustrates preferred pit depths wherein upper section 32 has a depth such that it is disposed completely within raised rib 30 (i.e., upper section 32 does not extend into trim panel main body 40) while lower section 33 has a depth that places it beneath rib 30 (i.e., entirely within main body 40). The depth relationship shown facilitates the melting of welding track 30 around upper section 32 while preventing the melting around lower section 33.

Figure 8:
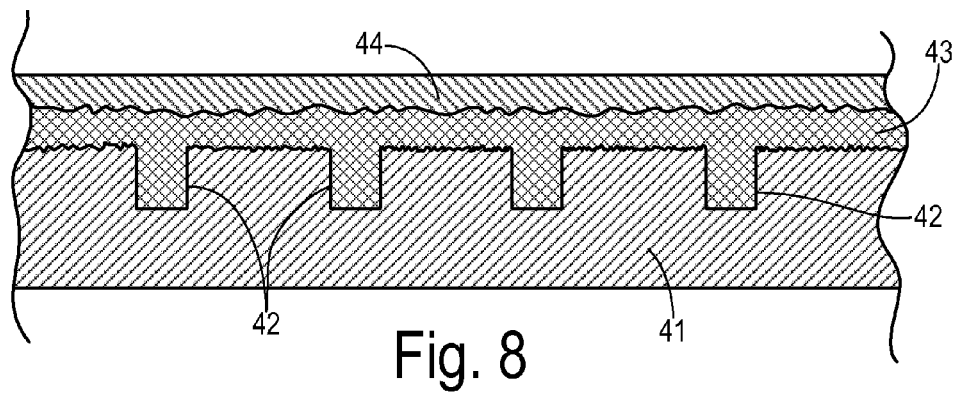
FIG. 8 is a cross-sectional view of the hot weld formed as a result of the stepped pits along line 6-6 of FIG. 5.

The respective melting and not melting of various portions of the trim panel around the stepped pits results in a hot weld structure as shown in FIG. 8. The unmelted perimeter portions around the lower sections results in a series of wells 42 within an unmelted main body portion 41 which becomes filled with a melted material 43 that originates from the heated portions of both the welding track and the welding flange. An unmelted upper portion 44 of the flange of the bladder member is thus strongly joined to trim main panel 41. Beside chemical bonding from the intermixing of the melted plastic of the two components, a mechanical bonding strength is added by the formation of melted tabs solidifying within wells 42.

Figure 9:
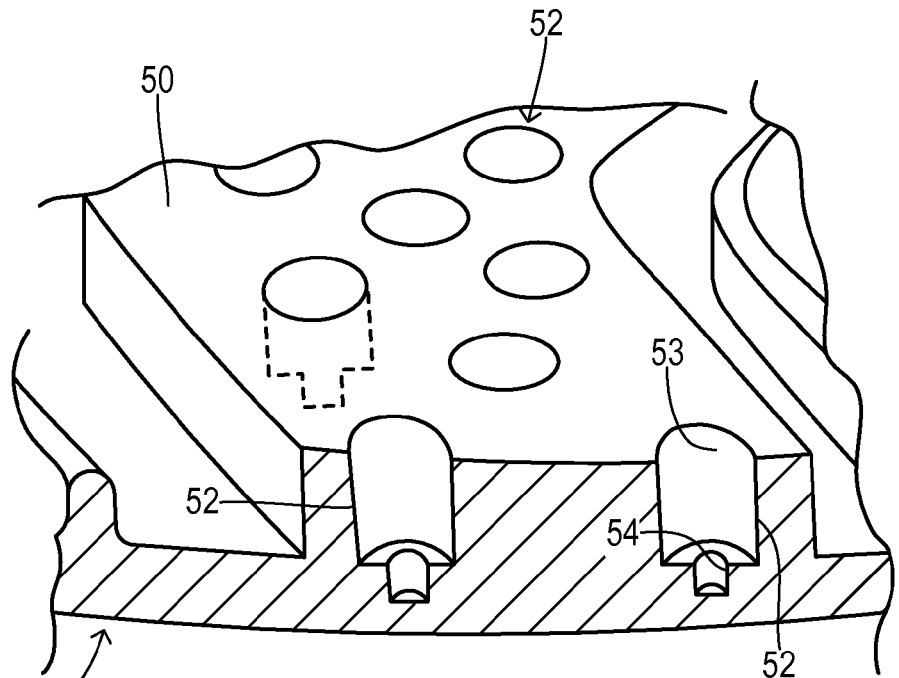
FIG. 9 is a perspective view of another embodiment of a weld track containing cylindrical, stepped pits.

FIG. 9 is a cross-sectional in through a raised rib welding track 50 on a panel body 51 wherein a plurality of stepped pits 52 are formed having cylindrical upper and lower sections 53 and 54, respectively. Stepped pits 52 are arranged in a radial spacing around the circumference of track 50 as well as being spaced axially (i.e., at different respective radial distances from the axial center of the bladder member) resulting in a further increase in hot weld strength along transverse directions. The cylindrical profiles of upper sections 53 and lower sections 54 assist in the desired melting and absence of melting in the two respective areas.

Figure 10:
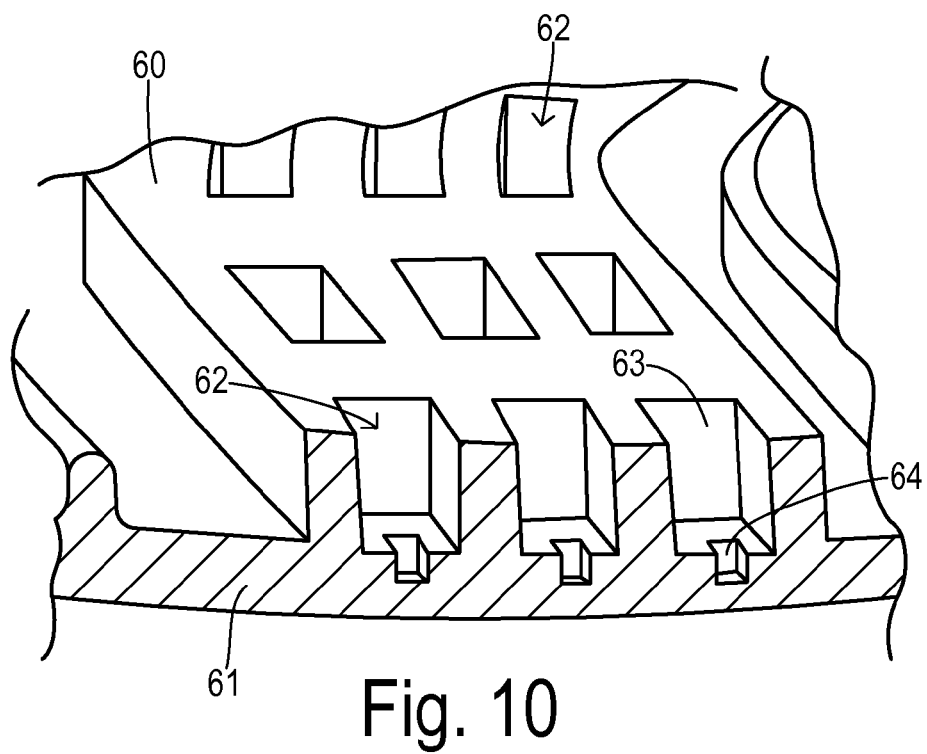
FIG. 10 is a perspective view of another embodiment of a weld track containing rectangular-cuboid stepped pits.

FIG. 10 shows an alternative embodiment wherein a welding track formed by a raised rib 60 on an inside surface of a trim panel main body 61 has a plurality of molded stepped pits 62 having profiles which are rectangular cuboids. The cuboid (i.e., box-shaped) upper sections 63 provides a larger profile (e.g., width) than lower sections 64, for example. Other potential shapes for the pits include pyramidal, conical, and other prism shapes. Each pair of respective upper and lower sections can be formed using the same shape or different shapes, and different pairs of pits can employ different shapes (e.g., one pair being cylindrical with an adjacent pair being rectangular).

What is claimed is:

1. An active bolster for providing an interior trim surface of an automotive vehicle, comprising:

a plastic-molded outer trim panel having a welding track on an inside surface; and a plastic-molded expandable bladder member having a central attachment section configured to attach to a support structure of the vehicle, a welding flange along a peripheral edge, and a pleated region between the central attachment section and the welding flange, wherein the welding track and the welding flange are joined by a hot weld to form a sealed chamber;

wherein the welding track includes a plurality of radially-spaced stepped pits, each stepped pit having an upper section defining a first opening with a respective first cross-sectional area, and each stepped pit having a lower section projecting from a respective upper section and defining a second opening with a respective second cross-sectional area smaller than the respective first cross-sectional area, wherein a perimeter of each upper section is melted by the hot weld and a perimeter of each lower section is not melted by the hot weld.

2. The active bolster of claim 1 wherein the welding track is comprised of a rib raised from the inside surface, wherein the upper sections of the stepped pits are disposed in the rib, and wherein the lower sections extend into the trim panel beneath the rib.

3. The active bolster of claim 1 wherein the upper and lower sections comprise respective cylindrical profiles.

4. The active bolster of claim 1 wherein the upper and lower sections comprise respective rectangular cuboid profiles.

5. The active bolster of claim 1 wherein the stepped pits are radially and axially spaced.

6. An active bolster comprising:
   a trim panel having a peripheral welding track; and
   a pleated bladder member attachable to a vehicle and including a peripheral flange hot welded with the welding track;
   wherein the track includes a plurality of radially-spaced stepped pits having upper sections with a melting perimeter and having lower sections projecting from a respective upper section each with an unmelting perimeter smaller than the melting perimeter.

7. The active bolster of claim 6 wherein the welding track is comprised of a rib extending at an inside surface of the trim panel, wherein the plurality of stepped pits are formed in the welding track, wherein the upper sections of the stepped pits are disposed in the rib, and wherein the lower sections extend into the trim panel beneath the rib.

\* \* \* \* \*